US011637715B2

(12) United States Patent
Crisler

(10) Patent No.: US 11,637,715 B2
(45) Date of Patent: Apr. 25, 2023

(54) VIRTUAL EVENT SEGMENTATION BASED ON TOPICS AND INTERACTIONS GRAPHS

(71) Applicant: MICROSOFT TECHNOLOGY LICENSING, LLC, Redmond, WA (US)

(72) Inventor: Matthew Galbraith Crisler, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/387,684

(22) Filed: Jul. 28, 2021

(65) Prior Publication Data

US 2023/0031716 A1  Feb. 2, 2023

(51) Int. Cl.
*H04L 12/18* (2006.01)
*G06T 19/00* (2011.01)
*G02B 27/01* (2006.01)
*H04L 67/306* (2022.01)
*H04L 67/50* (2022.01)

(52) U.S. Cl.
CPC ........ *H04L 12/1831* (2013.01); *G02B 27/017* (2013.01); *G06T 19/006* (2013.01); *H04L 12/1818* (2013.01); *H04L 12/1822* (2013.01); *H04L 67/306* (2013.01); *H04L 67/535* (2022.05); *G02B 2027/014* (2013.01); *G02B 2027/0141* (2013.01)

(58) Field of Classification Search
None
See application file for complete search history.

(56) References Cited

U.S. PATENT DOCUMENTS 10,498,856 B1  12/2019  Rogynskyy et al.
10,785,270 B2  9/2020  Keen et al.
(Continued)

FOREIGN PATENT DOCUMENTS

EP  3447711 A1  2/2019

OTHER PUBLICATIONS

"International Search Report & Written Opinion issued in PCT Application No. PCT/US22/031861", dated Sep. 5, 2022, 13 Pages.

*Primary Examiner* — Schquita D Goodwin
*Assistant Examiner* — Ishrat Rashid
(74) *Attorney, Agent, or Firm* — Newport IP, LLC; Jacob P. Rohwer

(57) ABSTRACT

The disclosed techniques improve the efficiency and functionality of virtual event platforms by segmenting users that attend a virtual event. An event segmenter retrieves user data for each attending user. The user data can include interaction data from past virtual events, topic data derived from user activity, social data defining the user's social relationships, etc. The event segmenter uses the user data to identify topics of interest for each user and generate an interaction graph for each user based on the topics of interest. The event segmenter uses the interaction graphs to generate user segments for the virtual event and assign each user to a user segment based on matching topics of interest. A model optimizer collects and analyzes user activity within each user segment to train the event segmenter to modify interaction graphs. In this way, the event segmenter can improve the virtual event segmentation process over time.

19 Claims, 10 Drawing Sheets

(56) References Cited

U.S. PATENT DOCUMENTS

| | | | |
|---|---|---|---|
| 2003/0227479 A1* | 12/2003 | Mizrahi | G09B 7/00 |
| | | | 715/753 |
| 2008/0215607 A1* | 9/2008 | Kaushansky | G06Q 30/02 |
| | | | 707/999.102 |
| 2009/0119604 A1 | 5/2009 | Simard et al. | |
| 2012/0179981 A1 | 7/2012 | Whalin et al. | |
| 2012/0249741 A1* | 10/2012 | Maciocci | G06T 19/006 |
| | | | 348/51 |
| 2017/0011039 A1 | 1/2017 | Spaulding et al. | |
| 2017/0140398 A1 | 5/2017 | Fleischman et al. | |
| 2018/0375676 A1 | 12/2018 | Bader-Natal et al. | |
| 2019/0116210 A1* | 4/2019 | Keen | H04L 67/306 |
| 2020/0005158 A1 | 1/2020 | Kulkarni et al. | |
| 2020/0287736 A1 | 9/2020 | Zhuk et al. | |
| 2020/0313919 A1 | 10/2020 | Gurr et al. | |
| 2021/0058264 A1 | 2/2021 | Fahrendorff et al. | |

\* cited by examiner

VIRTUAL EVENT SEGMENTATION BASED ON TOPICS AND INTERACTIONS GRAPHS

BACKGROUND

As enterprises and online communities continue to expand in size and scale, individuals that make up these organizations may be geographically dispersed throughout a country or even the world. These individuals may be users of a service, members of an institution, or employees of a company, and can number in the thousands or even hundreds of thousands. Oftentimes, individuals within various organizations may wish to gather and collaborate or exchange information. This is typically achieved through physical events such as a conference or a convention. For instance, researchers from various institutions may gather for a conference to present their findings and meet new collaborators. In another example, a video game studio can attend a convention to interact with fans and promote its products. In addition, the diversity of these groups of individuals can be leveraged by various organizations to benefit both the organization and the individuals. For example, collecting feedback from a userbase with diverse experiences and backgrounds can enable an organization to accurately assess how users interact with its products and improve existing features or plan future releases.

However, despite the many benefits, hosting a physical event is a major undertaking requiring extensive planning and significant commitment of resources. Typically, such events involve selecting an appropriate venue, inviting various exhibitors, arranging travel and housing, catering and so forth. Therefore, hosting a successful event requires a large, dedicated event staff to support the many logistical elements of the event. To circumvent the heavy logistical and resource demand as well as other obstacles to hosting a physical event, many organizations have turned to hosting virtual events to continue promoting collaboration, marketing products, and engaging with users. By hosting a virtual event, an organization can avoid much of the time and cost of physical events as virtual events merely require attendees have a computing device and an internet connection to access the virtual event.

Unfortunately, while free of many of the burdens of physical events, virtual events still present many technical challenges that can hinder both an organization's ability to host a successful event and a user's experience of the event. For instance, a virtual event may utilize a three-dimensional environment to emulate a physical event space to enhance the user experience. In such environments, an attendee may have a virtual avatar with which they move about and interact with the event space and other attendees. However, for large events with hundreds, thousands or even tens of thousands of attendees, transmitting data for every user's avatar (e.g., location, activity, speech, etc.) can become cumbersome and outright unfeasible due to many technical limitations (e.g., network bandwidth, processing power, etc.)

It is with respect to these and other considerations that the disclosure made herein is presented.

SUMMARY

The disclosed techniques improve the efficiency and functionality of virtual events by providing a system for intelligently segmenting attendees of a virtual event using a diverse data set useable to identify mutual areas of interest. By segmenting users of a virtual event, the system of the present disclosure can alleviate the severe network traffic associated with transmitting data for hundreds or even thousands of users in an event space. In addition, the disclosed techniques provide an engaging event space that promotes meaningful interactions and enhance the user experience.

Generally described, the system utilizes an event segmenter to collect data for individual attendees and generate an interaction graph to identify various aspects of the attendee such as interests, topics of expertise, and social connections. The event segmenter can use this data to automatically place similar users into user segments. In addition, the system can utilize a component to monitor subsequent user interactions within each segment to refine the event segmenter and improve future user segments.

The event segmenter can utilize a diverse set of criteria to organize attendees of a virtual event into multiple user segments. In this way, the system can alleviate excessive traffic by limiting the amount data that must be transmitted to individual users. Thus, organizations can host events having thousands or even tens of thousands of attendees without incurring excessive computational load or network traffic. In addition, the system can enhance the user experience of the virtual event by providing a smaller, more intimate setting that is more conducive for engaging with other users. For instance, the event segmenter can detect that several users share matching interests (e.g., hobbies, technical expertise, etc.). The event segmenter can subsequently place these users together in a user segment to promote more meaningful interactions for the users.

In various examples, the event segmenter can identify areas of interest for various users by collecting user data and generating an interaction graph for each user. The user data can be gathered in a wide variety of ways. For example, the event segmenter can gather data describing a user's activity with respect to various media such as a video or document having an associated topic. In a more specific example, the event segmenter can detect that a user frequently interacts with documents on software development and record it as a topic of interest in the user's interaction graph. The event segmenter can then compare interaction graphs to identify matches and accordingly place users with matching interests in a user segment.

Furthermore, a model optimizer can be configured to monitor interactions within each user segment to enable the event segmenter to refine and improve the segmentation process. In the example discussed above, the event segmenter may detect that, while it successfully grouped users that are interested in software development, the level of interaction as indicated by monitoring data was low. In response, the event segmenter can then utilize more specific topics (e.g., subtopics) associated with software development. For instance, the event segmenter can detect that some users work in game development while others develop software for financial services. Using these subtopics of the more general "software development" topic, the event segmenter can match users based on specific areas of expertise to increase interaction within various segments.

Consequently, the techniques disclosed herein provide flexibility and customizability in segmenting users. In contrast to existing solutions, utilizing interaction graphs to organize users of matching topics of interest enables the system to promote high quality interactions to enrich the user experience of virtual events. In addition, by providing an intelligent automated approach to segmentation, the system can alleviate the burden of manually configuring segmentation settings. In this way, the system can reduce human errors thereby conserving resources and improving performance.

As discussed above, and further herein, the disclosed system can allow event organizers to host productive and engaging virtual events that promote valuable interactions for users. The many technical benefits of the disclosed system are enabled by an event segmenter that utilizes custom interaction graphs to identify areas of interest or expertise for each user based on a diverse data set that is gathered for each user.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
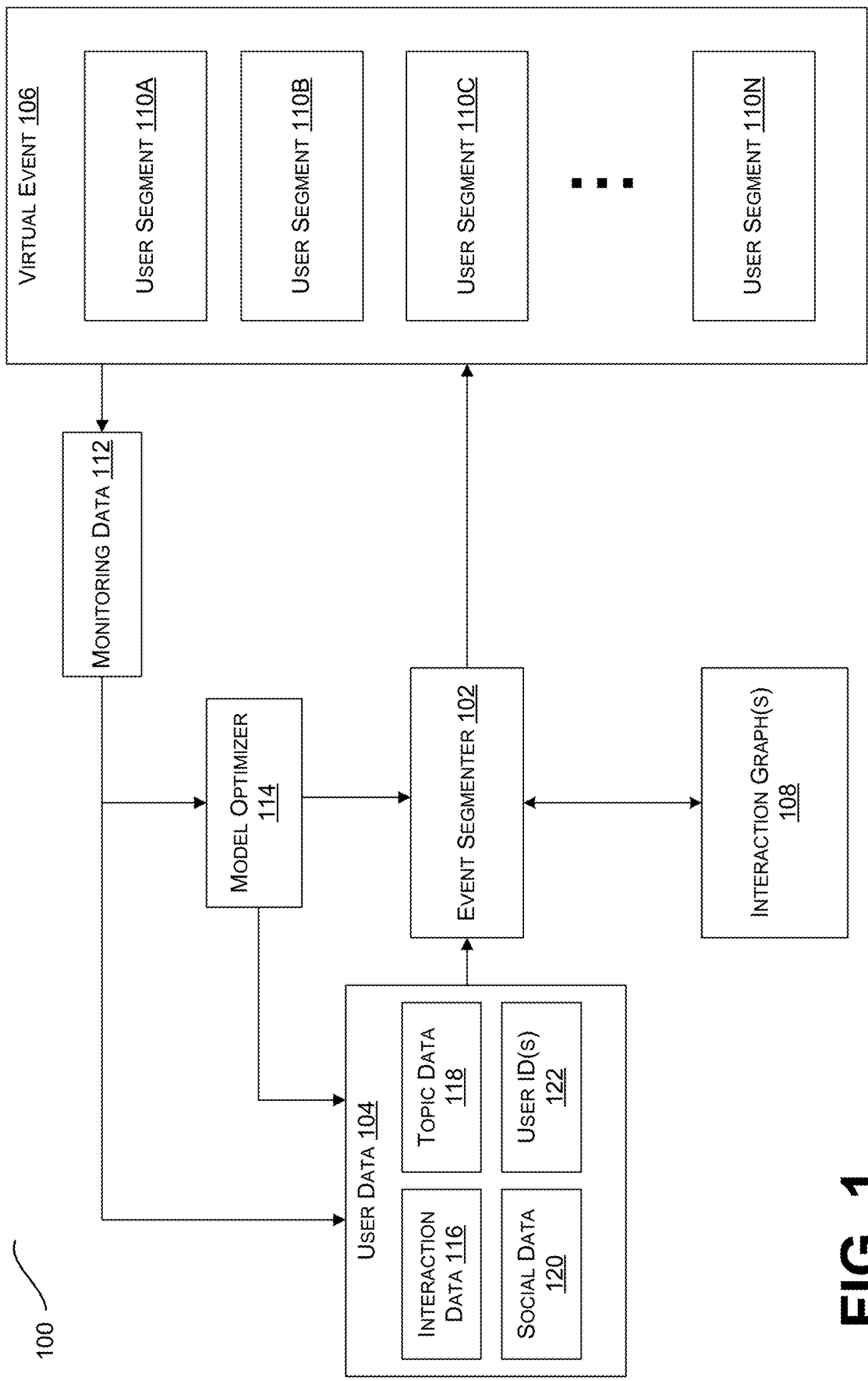
FIG. 1 is an example system architecture illustrating an event segmenter utilizing user data to generate interaction graphs and user segments of a virtual event.

The techniques describe herein provide systems for optimizing the use of computing resources and to improve the operation of virtual event platforms that provide event segmentation for various organization that host virtual events. Virtual event platforms can include computing resources, storage, and other components for executing applications, storing data, and the like. For events with hundreds or even thousands of attendees, segmentation is a useful method to enable an organization hosting an event to maintain performance at large scales as well as enable users to easily communicate with each other. Segmentation can be performed in many ways both automatically and manually. In one example, an organization can simply segment attendees using their location where only data for attendees within a certain distance is transmitted. In another example, segmentation can be performed by the organizers where a member of the event staff manually groups attendees into segments. Alternatively, the organization may allow attendees themselves to form segments.

However, performing simplistic segmentation such as the location-based method briefly discussed above, can potentially degrade the user experience should a particular user be placed in a segment that is not conducive to productive interactions. For instance, various users in a segment may have differing areas of interest or expertise which may not lead to useful interactions for individual users. In addition, manual segmentation can place undue burden on event organizers who may need to organize thousands of attendees or cause conflicts when attendees are left to form segments themselves. Without more sophisticated criteria for segmenting attendees, the user experience of the virtual event may be greatly degraded.

To more effectively segment users, organizations that host virtual events can utilize an event segmenter to gather user data for attendees of a virtual event. As will be discussed further below, user data can describe many aspects of a particular user such as hobbies, areas of expertise, social connections to other users and so forth. It should be appreciated that user data is only collected with the express consent of individual users. The event segmenter can then analyze the user data to generate an interaction graph for each user. Based on a search for matching topics of interest in the interaction graphs, the event segmenter can group compatible users to promote productive and meaningful interaction.

The disclosed techniques address several technical problems associated with segmenting groups of users in a virtual event. For instance, to reduce the computational load of hosting a large event with thousands of users, an organization may choose to segment users into smaller groups. In a specific example, a virtual event may begin or end with a main event such as a keynote address (e.g., a speech, a presentation, etc.) that each user views independently. Following or prior to the main event, the users can then freely move about and interact with a three-dimensional event space using a virtual representation (e.g., an avatar). Conventional systems may simply segment users based on their proximity to other users in the event space. For instance, a user may be limited to only viewing and interacting with other users within a five-meter radius. However, simple segmentation can cause users to be placed in an incompatible segment leading to reduced interaction and thereby degrading the user experience. By segmenting users through identifying matching topics of interest, the disclosed system increases the likelihood of placing a user in a segment that is conducive to high quality interaction that adds value to the user's virtual event experience.

In another example of the technical benefit of the present disclosure, the graph-based event segmentation described herein improves the security of virtual event platforms. This is possible due to the customized placement of users within various segments as discussed above and in further detail below. By automatically placing each user in a segment in which the user feels engaged and comfortable, the system can reduce network traffic as users are not frequently moved between segments thereby conserving computing resources and minimizing security vulnerabilities. In addition, by automating the segmentation process, the disclosed system can reduce the possibility of human error and further preventing malicious attacks on the virtual event.

Various examples, scenarios, and aspects that enable secure multi-tenant subscription sharing are described below with reference to FIGS. 1-8.

FIG. 1 illustrates an example system 100 in which an event segmenter 102 utilizes user data 104 for users of a virtual event 106 to identify topics of interest and generate interaction graphs 108 for each user. Using the interaction graphs 108, event segmenter 102 can organize a virtual event 106 into several user segments 110A-110N (which may be collectively referred to herein as user segments 110) each containing several users based on matching topics of interest in the interaction graphs 108. As mentioned above and in additional detail below, the system can monitor the user segments 110 to generate monitoring data 112 that records user activity within the user segments 110. Monitoring data 112 can then be provided to a model optimizer 114 for analysis to determine if a user was placed in a suitable user segment 110A. As will be discussed in additional detail below, model optimizer 114 enables the system to refine the process of segmentation and improve over time with respect to individual users as well as various virtual events as a whole.

In various examples, user data 104 can comprise data describing many aspects of a particular user. For instance, user data 104 can include interaction data 116 defining a user's past virtual event interactions. In a specific example, a user may have previously attended an event related to software engineering and expressed high engagement. Thus, event segmenter 102 may record software engineering as a topic of interest in the user's associated interaction graph 108. In another example, user data 104 can include topic data 118 defining a user's interaction with media of various topics in both professional and personal contexts such as work experience and hobbies. It should be understood that media can include documents, videos, webpages, and the like. In a specific example, event segmenter can detect that a user frequently interacts with online documentation related to software development. As with the above example, the interaction graph associated with the user can include a software engineering topic of interest.

Furthermore, user data 104 can additionally include social data 120 defining a user's social connections to other users such as coworkers, friends, and so forth. Social data 120 can be collected from a variety of sources such as social networking services, corporate organization charts, communication data such as email or text and so forth. In this way, event segmenter 102 can group users that are already acquainted with each other to provide a familiar and comfortable environment. Alternatively, event segmenter 102 may be configured to generate user segments 110 consisting of users that do not share a social connection to encourage users to form new connections.

In addition, user data 104 can include one or more user IDs 122 to identify an associated user across various platforms or services. For instance, user ID 122 can comprise a user's name, an email address provided to the user by an employer, a screen name that the user utilizes in a social networking service, and so forth. Based on the context of the virtual event 106, event segmenter 102 can utilize a user's various user IDs 122 to match a user to a user segment 110A. For example, a virtual event can be a research conference. Accordingly, event segmenter 102 can utilize user IDs 122 to organize users based at least in part on email addresses associated with each user's research institution. The system may also be configured to display a user ID 122 alongside a user's avatar (see FIG. 3A-3B). In a specific example, a virtual event may be a convention for players of an online video game. In this case, event segmenter 102 can display a user's in-game name to allow fellow players to easily recognize the user.

As mentioned above and discussed in further detail below, event segmenter 102 can generate an interaction graph 108 for each user of a virtual event 106 based on the user data 104. Interaction graphs 108 enable the system to efficiently organize the various topics of interest identified by analyzing the user data 104. By comparing each of the interaction graphs 108, event segmenter 102 can identify any users with matching topics of interest. Event segmenter 102 can additionally be configured to modify a user's interaction graph 108 over time in response to various factors such as activity monitored during a virtual event 106, changes in user data 104, and so forth. As will be discussed below with respect to FIG. 2, modifying an interaction graph 108 can include adding or removing a new topic of interest, identifying new subtopics, and so forth. In addition, interaction graphs 108 for each user can be saved to persist for use across multiple virtual events 106.

Upon detecting matching topics of interest, event segmenter 102 can generate user segments 110A-110N for virtual event 106. Each user segment 110 can be a virtual three-dimensional space that users can move about and interact with. It should be understood that user segments 110 can each be different three-dimensional environments. Alternatively, user segments 110 can all be separate instances of the same three-dimensional event space. User segments 110 can be generated for one or several matching topics of interest. In various examples, a user segment 110A can be associated with a topic of interest that is related to the general purpose of the virtual event 106. For instance, a virtual event 106 for a conference on software engineering may have a user segment 110A that is dedicated to firmware development, another user segment 110B that is dedicated to web design and so forth. In another example, user segments 110 may not be related to the virtual event 106. For instance, virtual event 106 can be a virtual social gathering hosted by a company for its employees. Accordingly, virtual event 106 can include a user segment 110A for employees that enjoy fishing, a user segment 110B for employees that enjoy cycling, and the like. In addition, and as will be discussed below, event segmenter 102 can be configured to selectively analyze interaction graphs 108. For instance, in the software engineering conference discussed above, event segmenter 102 may only match users 202 based on topics of interest 204 that are related to software engineering. In a specific example, event segmenter 102 may detect that several users 202 utilize similar technologies in their respective fields of work such as a particular cloud platform. Accordingly, event segmenter 102 can match these users 202 in a user segment 110A based on their shared experience using the cloud platform.

Once users are organized into their respective user segments 110, system 100 can be configured to monitor user activity within the user segments 110 which is recorded in monitoring data 112. As will be described below, monitoring data 112 can include many different types of user activity such as a user's of movement within the three-dimensional space of the user segment 110A, a user's orientation and position relative to other users in user segment 110, an amount of speech, and so forth.

Monitoring data 112 can be provided to model optimizer 114 for analysis. As will be discussed below, model optimizer 114 can be configured to analyze monitoring data 112 to determine interaction scores (see FIG. 4) for each user based on the various types of user activity in monitoring data 112. If model optimizer 114 determines a user's interaction score falls below a threshold interaction score, model optimizer 114 may inform event segmenter 102 which can then modify the interaction graph 108 for the user. In this way, event segmenter 102 can improve the segmentation process over time and tailor segmentation of individual users.

In various examples, monitoring data 112 may also include user data 104 to expand the data set that is available to event segmenter 102 to provide additional granularity when segmenting users and further improve the user experience. For instance, monitoring data 112 may indicate that a particular user is especially talkative in their assigned user segment 110A. Accordingly, at least a portion of monitoring data 112 can be included in interaction data 116 associated with the user. In addition, another portion of monitoring data 112 can be included in topic data 118 to note that the user is particularly knowledgeable in the subject matter for user segment 110A. In another example, a user may exchange contact information with another user of their assigned user segment 110B. Thus, a corresponding portion of monitoring data 112 can be included in each user's social data 120 to note the newly formed social connection.

In a similar manner to the above discussion, model optimizer 114 can be configured to modify and expand upon various aspects of user data 104 and can provide more complex details to user data 104. For example, model optimizer 114 may detect that two users within a user segment 110C spend an especially long time interacting with each other. Model optimizer 114 can modify each user's social data 120 to point out their particular connection. Event segmenter 102 can accordingly prioritize matching these two users when forming new user segments 110 for virtual event 106 or future virtual events 106. In another example, model optimizer 114 can modify topic data 118 to point out a user's favorite topics of interest based on their activity in a user segment 110A. As with the previous example, event segmenter 102 can prioritize these topics of interest when assigning the user to future user segments 110.

Figure 2A:
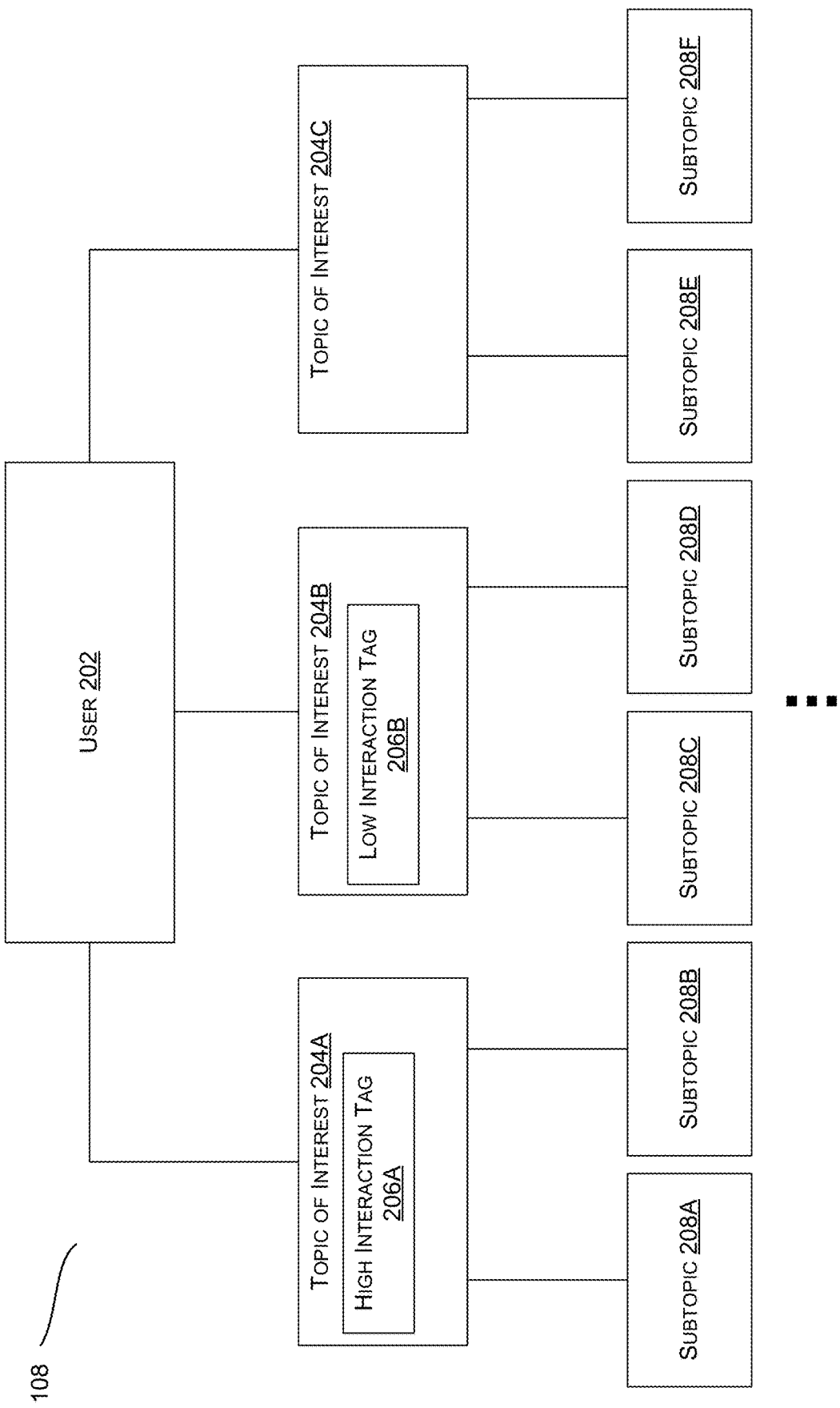
FIG. 2A illustrates aspects of an interaction graph recording topics of interest of a user.

Turning now to FIG. 2A, aspects of an interaction graph 108 will be shown and described. As discussed above, interaction graph 108 is generated based on user data 104 and enables event segmenter 102 to efficiently record and analyze data associated with a user 202. Interaction graph 108 can associate several topics of interest 204A-204C (may be referred to in the collective as 204) such as software engineering in the examples briefly mentioned above. Event segmenter 102 can analyze interaction graph 108 and other interaction graphs to find matching topics of interest 204. Upon detecting matching topics of interest 204, event segmenter 102 can place matching users in an event segment 110A. In a user segment 110A, the system 100 can monitor user activity to calculate an interaction score for user 202 and determine if the user 202 was placed in a suitable user segment 110 in comparison to a threshold score (see FIG. 4). It should be understood that topics of interest 204 can include any topics that are relevant to a user 202 such as their area of expertise, hobbies, professional experience, and so forth. Topics of interest for user segments 110 can be defined in a variety of ways, such as manually defined by an administrative entity (e.g., an event producer), automatically defined by a machine learning application based on enterprise content management systems, as well as through analysis of user data 104 by event segmenter 102.

In a specific example, an organization may be hosting a virtual event 106 for software engineering. To ensure all user segments 110 are relevant to the overarching goal of the virtual event 106, the event producers can manually define various topics of interest for user segments 110. These topics of interest can include aspects of software engineering such as program management, firmware development, and so forth. Based on user data 104 for each user 202, event segmenter 102 can determine a level of experience for each user 202 with respect to each topic of interest 204. Event segmenter 102 can then match each user 202 to a corresponding user segment 110 based on their level experience indicated in their associated interaction graph 108. For example, a user 202 may have previous experience in application development before transitioning to their current role in program management as indicated in their associated user data 104 and interaction graph 108. Accordingly, event segmenter 102 can assign the user 202 to a user segment 110A dedicated to program management. In this way, event segmenter 102 can assign each user 202 to a user segment 110A using the predefined topics of interest for user segments 110.

In another scenario, an enterprise may utilize a network-based platform for managing content such as documents, videos, and so forth for various users 202 (e.g., employees). When hosting a virtual event, the enterprise can utilize various machine learning approaches to identify organization-wide topics of interest for generating user segments 110. The topics of interest for user segments 110 can be identified based on categories of user activity in the various pieces of content (e.g., edits, mentions, viewing time, etc.). For instance, identified topics of interest for user segments 110 can include various business areas of the enterprise such as engineering, finance, legal, and so forth. Accordingly, event segmenter 102 can match various users 202 to user segments 110 for each business area based on content activity for each user 202.

In still another example, topics of interest for user segments 110 can be identified by analysis of user data 102. In this way, each user 202 can have an interaction graph 108 that reflects their unique set of topics of interest 204 with which event segmenter 102 can use to match to other users 202 to form user segments 110. As discussed, identifying topics of interest in this way can uncover diverse aspects of a particular user 202 such as hobbies and personal interests which can lead to high levels of interaction.

In various examples, a user 202 may be assigned to a user segment 110A dedicated to a topic of interest 204A. The system 100 can monitor how the user 202 interacts with other users of user segment 110A to calculate an interaction score as discussed above and in further detail below. If the interaction score of user 202 satisfies the threshold score, event segmenter 102 can note the topic of interest 204A as leading to high interaction for user 202 by attaching a high interaction tag 206A to topic of interest 204A. Thus, when placing user 202 in future user segments 110, event segmenter 102 can detect topic of interest 204A as a suitable topic of interest 204.

Alternatively, event segmenter 102 can detect that user 202 shares a topic of interest 204B with other users of virtual event 106. Event segmenter 102 can then place user 202 in a user segment 110B for topic of interest 204B. However, unlike in user segment 110A, user 202 may exhibit very little interaction with other users in user segment 110B. Accordingly, event segmenter 102 can use a low interaction tag 206B to indicate that topic of interest 204B is not suitable for user 202. In response, event segmenter 102 can proceed down the interaction graph 108 to identify one or more subtopics 208 that are related to topic of interest 204B. Event segmenter 102 can then match user 202 based on subtopic 208C or 208D and not topic of interest 204B with the hope of increasing the user's level of interaction by placing them in a smaller segment with a more focused topic based on subtopic 208C or 208D. In another example, event segmenter 102 can determine that topic of interest 204B is not suitable for user 202. In response, event segmenter 102 can match user 202 based on a different topic of interest 204C to increase the level of interaction for the user 202.

In various examples, subtopics 208A-208F can be more specific aspects of a more general topic of interest 204. In a specific example, topic of interest 204B may be associated with electrical engineering. However, due to the disparate fields of electrical engineering, simply grouping users based on electrical engineering may lead to reduced interaction between users. Thus, event segmenter 102 can move to subtopic 208C which can be associated with a specific discipline of electrical engineering such as signal processing. In this way, event segmenter 102 can match user 202 with other users that have a matching subtopic 208C. As will be described further below, event segmenter 102 may also detect that interaction scores for a threshold number of users fall below the threshold score indicating that topic of interest 204B is likely unsuitable for most users of virtual event 106. In response, event segmenter 102 may simply remove topic of interest 204B from interaction graphs 108 of every user of the virtual event 106. By tagging topics of interest 204 with various tags 206 and identifying subtopics 208, event segmenter 102 can learn which topics lead to high levels of interaction for each user 202 and/or for a collective group of users. In this way, event segmenter 102 can not only intelligently match users 202 based on matching topics of interest 204, event segmenter 102 can improve over time to maintain a high-quality user experience.

Figure 2B:
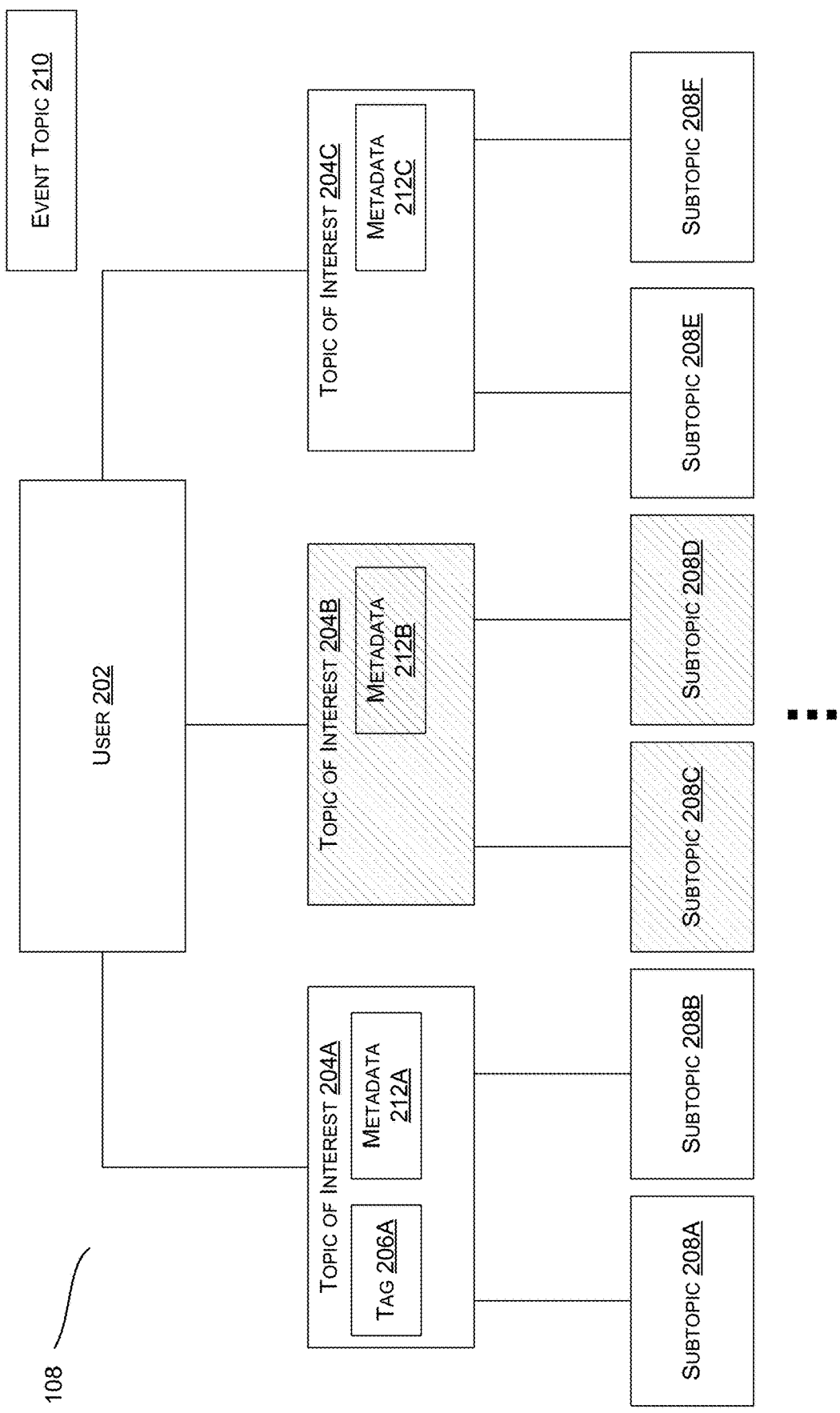
FIG. 2B illustrates additional aspects of an interaction graph of a user.

Turning to FIG. 2B, additional aspects of the interaction graph 108 will be shown and described. In various examples, event segmenter 102 can selectively analyze interaction graph 108 based on an overarching event topic 210. Event topic 210 can be defined by an administrative entity such as an event producer for virtual event 106. Event segmenter 102 can be configured to only generate user segments 110 with topics of interest 204 that are relevant to event topic 210. The relevance of a topic of interest 204A to event topic 210 can be determined in many ways. For instance, each topic of interest 204A-204C can include metadata 212A-212C that describes the corresponding topic of interest 204A-204C as well as related topics.

As shown in FIG. 2B, event segmenter 102 can determine that topic of interest 204B is not associated with event topic 210 based on metadata 212B. In response, event segmenter 102 can ignore topic of interest 204B when generating user segments 110. In a specific example, event topic 210 can be related to product design. In this instance, topic of interest 204A may be merchandising with metadata 212A indicating that topic of interest 204A is related to event topic 210. Conversely, topic of interest 204B can be fishing, a hobby that user 202 engages in regularly. Accordingly, event segmenter 102 can detect that metadata 212B indicates no relation to event topic 210. In response, event segmenter 102 will omit topic of interest 204B from consideration when generating user segments 110 even if other users of virtual event 106 have matching topics of interest 204B.

In addition, event segmenter 102 can give preference to certain topics of interest 204 based on user activity recorded in user data 104. For instance, user data 104 may indicate that user 202 frequently reads a company blog on current engineering efforts but also writes another company blog on accounting and finance. As such, event segmenter 102 can infer that while user 202 is interested in engineering, user 202 may be more knowledgeable in the realm of finance. Event segmenter 102 can note this in metadata 212A for the corresponding topic of interest 204A and match user 202 based on their knowledge of finance over their interest in engineering.

Furthermore, event segmenter 102 can consider additional details of the user activity recorded by user data 104 such as the amount of time user 202 spends interacting with various documents, the number of edits user 202 makes to each document, and the like. In an alternative to the above example, event segmenter 102 may detect that user 202 spends significantly more time reading the engineering blog in comparison to writing the finance blog. Accordingly, event segmenter 102 can infer that user 202 is more interested in engineering despite their knowledge of finance. User 202 can then subsequently be matched with other users that share their interest in engineering.

Figure 3A:
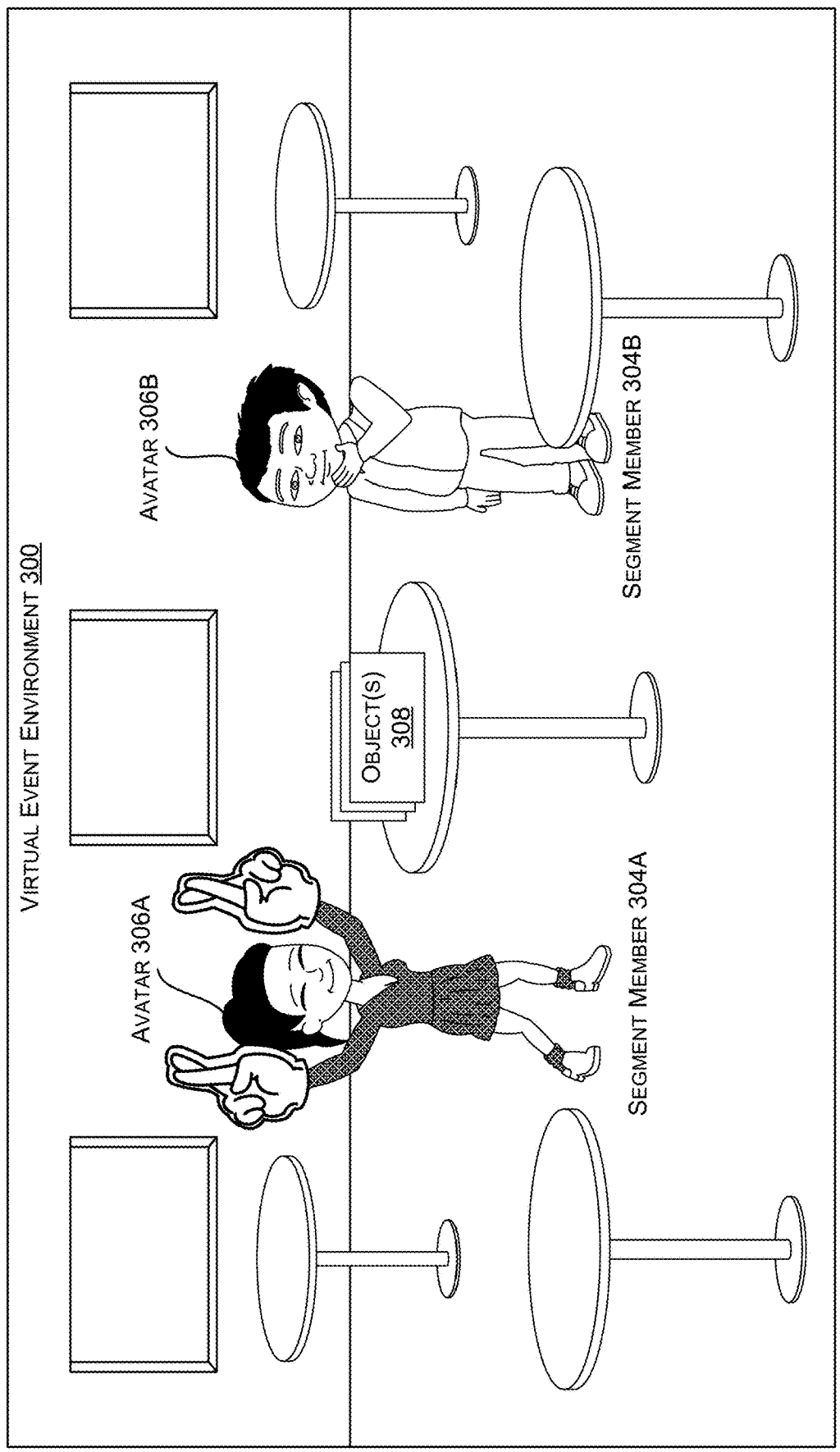
FIG. 3A illustrates an example environment for a group of users in a user segment of a virtual event.

Turning now to FIG. 3A, aspects of a three-dimensional virtual event environment 300 are shown and described. Each user segment 110 of the virtual event 106 can have an associated virtual event environment 300 that enables members 304A-304B of user segments 110 to communicate and interact with each other. As mentioned above, each segment member 304 can have an associated avatar 306A-306B with which members 304 move about and interact with virtual environment 300. In some examples, avatars 306 can be generated based on a user's appearance to provide a recognizable avatar when attending a virtual event. For instance, a user 202 attending a professional conference may wish to utilize an avatar 306 that resembles their real-life appearance. Alternatively, avatars 306 can be generated and customized by associated segment members 304.

In addition, virtual event environment 300 can include one or several objects 308 that segment members 304 can manipulate and interact with. In various examples, an object can be a visual aid for a presentation, a decoration piece and so forth. In addition, objects 308 can be configured based on the number of users present in virtual event environment 300. For instance, objects 308 can be seats at conference table. In this example, the size of the conference table and number of available seats can be automatically adjusted based on the number of users in virtual event environment 300. In other examples, objects 308 can be specifically designed and displayed in the virtual event environment 300 to encourage interaction based on a topic of interest 204A. For instance, several users 202 may be assigned to a user segment 110A based on a shared topic of interest 204 associated with video game development. In this example, event segmenter 102 can detect that various segment members 304 may have utilized the same cloud platform when implementing certain features for their respective projects based on user data 104 for each segment member 304. In response, an object 308 displayed in the virtual event environment 300 can be documentation for the cloud platform to inform segment members 304 of their shared topic of interest 204 to spur interaction among the segment members 304.

Virtual event environment 300 can be implemented in a variety of ways such as in virtual reality (VR), augmented reality (AR), mixed reality (MR), and so forth. In addition, segment members 304 can view and interact with virtual event environment 300 in many ways such as by a conventional computing device (e.g., a laptop, a desktop computer, etc.) or a head-mounted computing device. It should be understood that the head-mounted computing device can include AR, VR, or MR devices and can be opaque or include see-through displays.

Figure 3B:
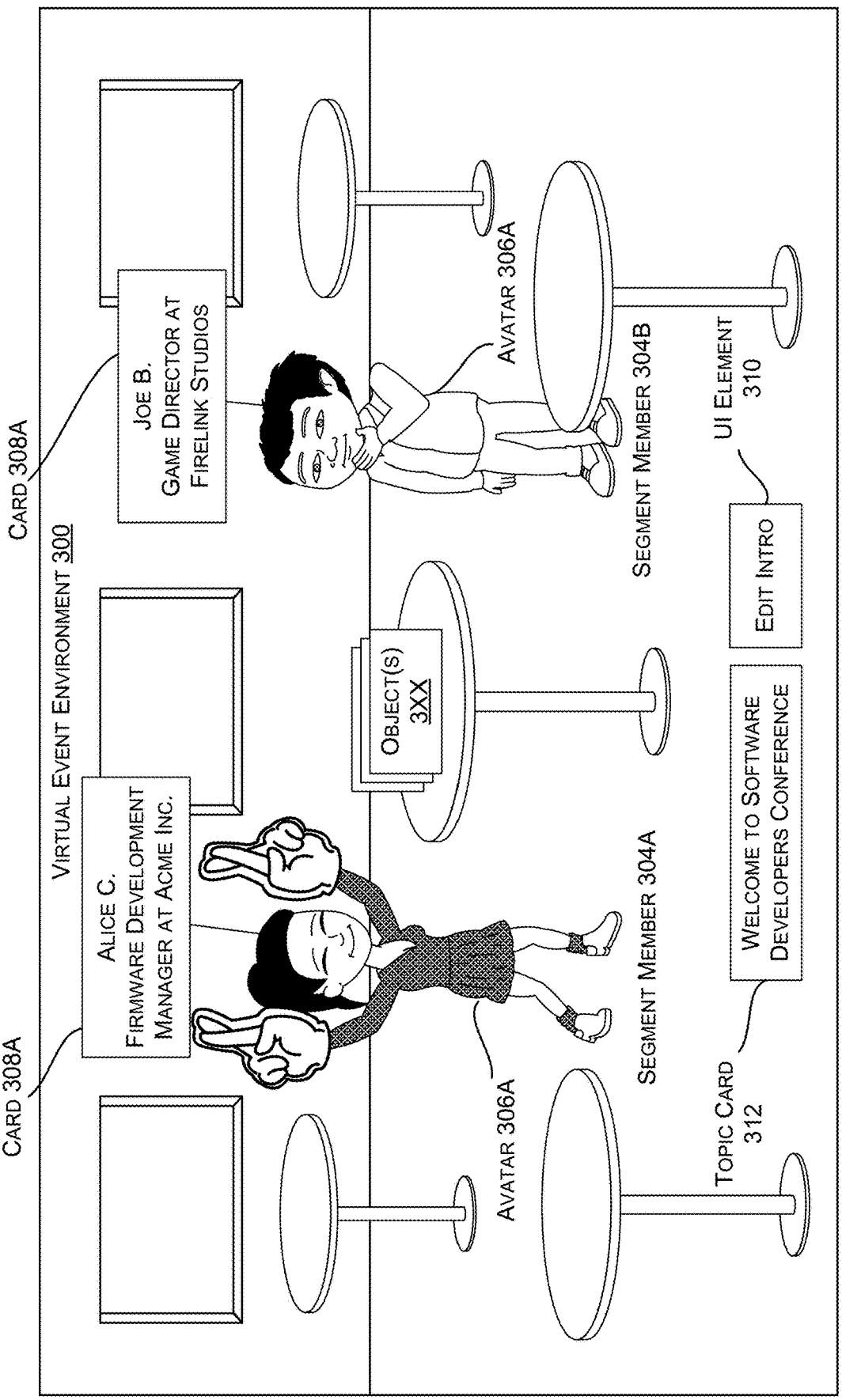
FIG. 3B illustrates another example environment for a group of users in a user segment of a virtual event.

As shown in FIG. 3B, virtual event environment 300 can be configured to enable segment members 304 to present information to other segment members 304 using a card 308A-308B that is displayed in association with each avatar 306. As discussed above, cards 308 can display various information such as a name, an occupation, an area of expertise, and the like. In addition, the content of a card 308A associated with a segment member 304A can be modified by the segment member 304A such as by selecting a UI element 310. For instance, in FIG. 3B, segment member 304A has configured her card 308A to display her name, Alice C. and her occupation as a firmware development manager at Acme Inc. Similarly, segment member 304B has configured his card to display his name, Joe B. and his role as game director at Firelink Studios.

In addition, virtual event environment 300 can identify user segment 110 for segment members. For instance, a topic card 312 can display a topic of interest 204A to show segment members 304 their shared interests and promote interaction. Furthermore, topic card 312 can be modified for various user segments 110 and subsequently generated user segments 110. For instance, the virtual event environment 300 shown in FIG. 3B includes topic card 312 indicating that segment members 304 are grouped based on their shared interest in software development. However, as discussed above and in further detail below, user segments 110 that are generated for broad topics of interest 204 may require refinement to provide an ideal space for each user 202. Accordingly, at a later time during virtual event 106, segment member 304B may be placed in a new user segment 110 based on his work as a game director.

Figure 4:
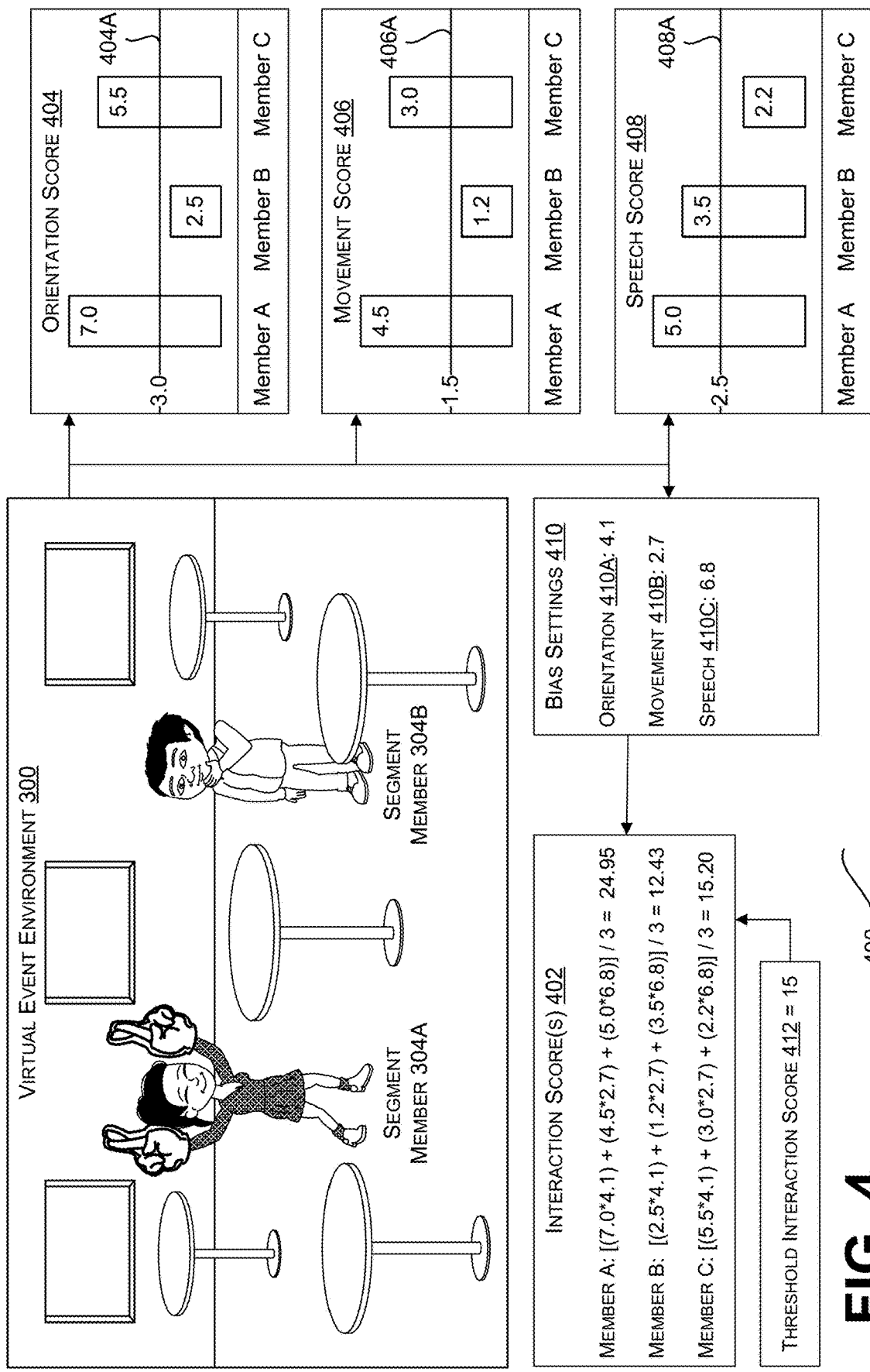
FIG. 4 illustrates an example system for analyzing interaction data gathered from monitoring a user segment.

Proceeding to FIG. 4, aspects of a system 400 for monitoring user activity in a virtual event environment 300 are shown and described. The system 400 can include model optimizer 114 and event segmenter 102 as well as any other suitable components for analyzing monitoring data 112. It should be understood that model optimizer 114 can be implemented using various machine learning approaches such as supervised learning, reinforcement learning, and so forth. As discussed above, monitoring data 112 for segment members 304 of user segments 110 can be analyzed to calculate an interaction score 402 for each segment member 304. Each interaction score 402 can comprise several factors each having a corresponding factor score 404-408. Interaction score 402 can be a simple aggregate of the factor scores 404-408 or include various bias settings 410 for emphasizing or de-emphasizing various factor scores 404-408 in a weighted average. Interaction scores 402 can then be compared to a threshold interaction score 412. If the interaction score 402 for a segment member 304A satisfies the threshold interaction score 412, system 400 can determine that segment member 304A was placed in a suitable user segment 110. Conversely, if the interaction score 402 for a segment member 304B does not satisfy the threshold score 412, event segmenter 102 can match segment member 304B based on one or more subtopics 208 or a different topic of interest 204.

In various examples, the system 400 can calculate an orientation score 404 which quantifies how a segment member 304 is oriented relative to other segment members 304 (e.g., whether a segment member 304A is facing other segment members 304). In the example shown and discussed with respect to FIG. 4, scores for member A can correspond to segment member 304A, and likewise for segment member 304B while scores for member C are for a third segment member 304 not illustrated in the virtual event environment 300. It should be understood that orientation can also include the position of a segment member 304A relative to other segment members 304.

Orientation score 404 can be calculated based on various factors such as the time a segment member 304A is facing other segment members 304, the number of segment members 304 a segment member 304A is facing, and so forth. As shown in orientation scores 404, member A possesses a high orientation score indicating that she is spending a significant amount of time facing other segment members 304. Conversely member B's orientation score 404 suggests that he is likely facing away from other segment members 304 or is positioned far away relative to other segment members 304.

Orientation score 404 can additionally include a threshold score 404A. Threshold orientation score 404A can be configured by an administrative entity such as an event producer for emphasizing orientation as an important indicator of the level of interaction for a segment member 304A. The importance of a particular factor score can be reflected by a higher associated threshold score 404A. In this way, while bias settings 410 can weight individual factor scores 404-408 in the overall interaction score 402, threshold orientation score 404A offers event producers additional granularity when analyzing user activity in user segments 110.

Like orientation score 404, interaction score 402 can include a movement score 406 that indicates the amount of movement for a segment member 304A in virtual event environment 300. Movement score 406 can be simply calculated from the amount of movement for a segment member 304A. Additionally, movement score 406 can also be calculated based on movement relative to other segment members 304. For instance, segment members 304 can move about the virtual event environment 300 in a group, thereby indicating a high level of interaction which can be reflected in a high movement score. In a specific example, movement score 406 as shown in FIG. 4 indicates a high movement score 406 for member A and member C. This can be due to member A and member C moving about virtual event environment 300 together while member B elected to stay still. In another example, movement score 406 can be calculated based on a movement direction of a segment member 304A. For instance, segment member 304A can be frequently moving towards other segment members 304 indicating a high level of interaction. This can be reflected by increasing the corresponding movement score 406 for segment member 304A. Movement score 406 can also include a threshold movement score 406A similar to orientation score 404 to enable an event producer to analyze individual factors.

As shown in FIG. 4, the system 400 can additionally calculate a speech score 408 for segment members 304. Speech score 408 can be simply calculated based on how much a segment member 304 speaks, such as by tracking a word count for each segment member 304. The system 400 may additionally be configured to analyze the context of speaking for each segment member 304. For instance, in a group discussion scenario a segment member 304B may not contribute much input aside from ancillary comments. In this case, while segment member 304B may accrue a high word count, it is clear from context that they are not very engaged with the conversation. This can be reflected by a reduced speech score 408 relative to a speech score 408 that is merely calculated based on word count alone. In another example, a segment member 304A may engage in substantive conversation with many different segment members 304 but is perhaps not as verbose as other segment members 304. Accordingly, segment member 304A can be assigned a higher speech score despite accumulating a low word count. By analyzing the context the actions of each segment member 304, the system 400 can optimize user interactions to provide a consistently high-quality user experience for each segment member 304. It should be understood that optimizing user interactions can include increasing a factor score 404-408 in response to detecting high-quality interactions and decreasing a factor score 404-408 in response to detecting low-quality interactions.

Similar to orientation score 404 and movement score 406, speech score 408 can include a threshold speech score 408A. As discussed above, including threshold scores for each factor score 404-408 can provide granularity for event producers when analyzing the activity of segment members 304 and enable event producers to further emphasize particular factor scores 404-408. For instance, a segment member 304A may have an interaction score 402 that satisfies the threshold score 412 but has a factor score 404-408 that does not satisfy a corresponding threshold 404A-408A that the event producer deems as especially important. In a specific example, based on the factor scores 404-408 and bias settings 410, member C has an interaction score 402 that exceeds the threshold score 412. However, speech score 408 for member C does not satisfy threshold speech score 408A as configured by the event producer. In this case, member C may be moved to a different user segment 110 to promote improved engagement with segment members 304 despite an overall interaction score 402 that satisfies threshold interaction score 412. As discussed above, system 400 can optimize user interactions in which high-quality interactions can lead to increased factor scores 404-408 and thus an increased interaction score 402. In this way, interactions scores 402 can clearly reflect the quantity of interaction as well as the quality of those interactions.

When calculating interaction scores for each segment member 304, the system 400 can calculate a simple sum of the factor scores 404-408 for comparison to threshold interaction score 412. Alternatively, the system 400 can be configured to calculate interaction scores as an average of the factor scores 404-408. Furthermore, one or more bias settings 410 can be applied to the factor scores 404-408 to calculate interaction scores 402 as a weighted average as illustrated in FIG. 4. It should be understood that while the examples shown and discussed with respect to FIG. 4 utilize three factor scores 404-408, interaction scores 402 can be calculated with any number of factor scores 404-408.

Figure 5:
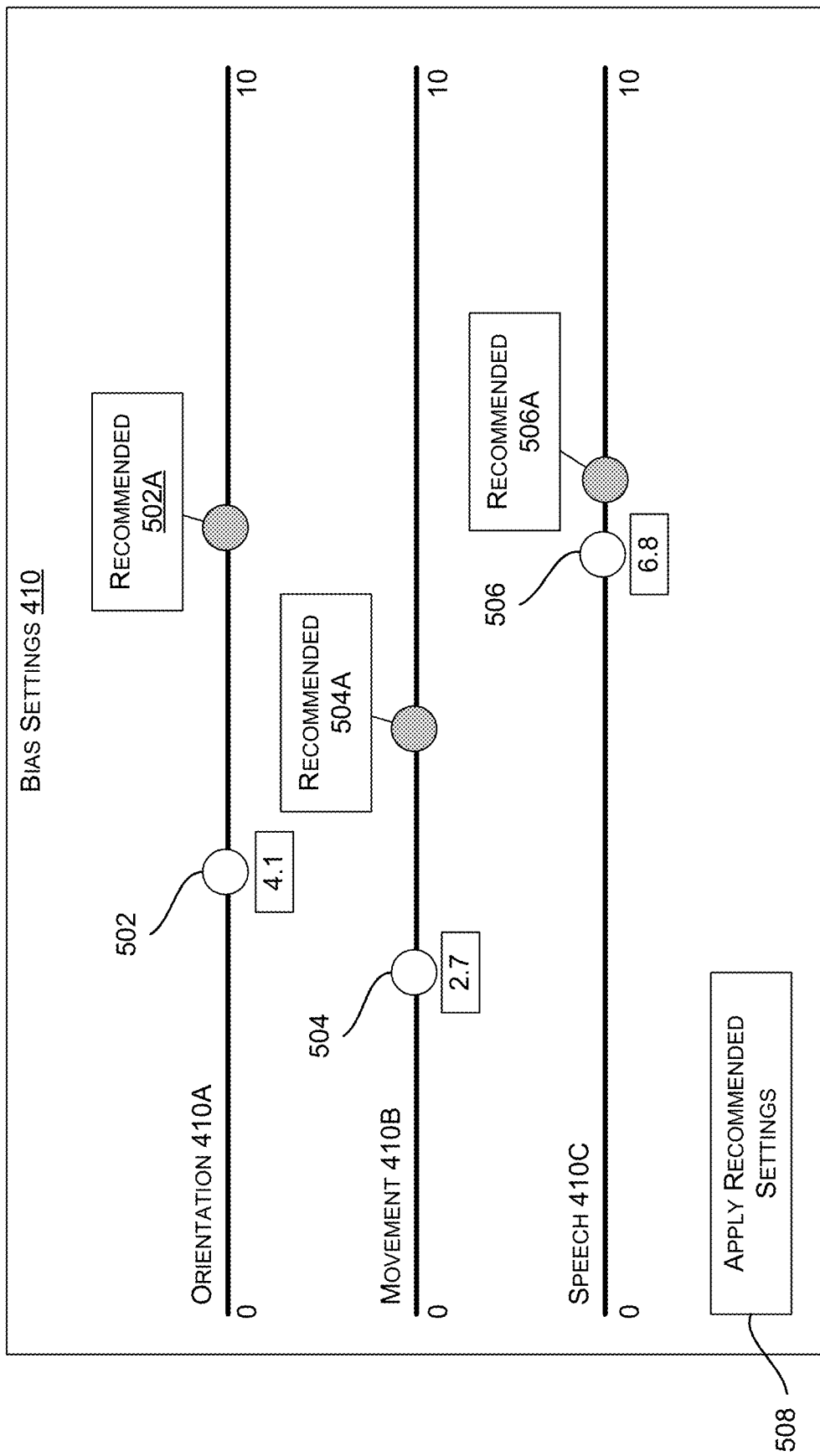
FIG. 5 illustrates an example interface for viewing and configuring various bias settings for an event segmenter.

Proceeding to FIG. 5, aspects of an interface 500 for adjusting the bias settings 410 are shown and described. As illustrated in FIG. 5, each factor score 404-408 has an associated slider icon 502-506 for adjusting the level of each individual bias setting 410A-410C. As discussed above, adjustable bias settings 410 enable an event producer to emphasize or deemphasize certain types of user activity when calculating individual interaction scores 402. It should be understood that while a specific type of user interface is illustrated and discussed with respect to FIG. 5, an interface for modifying bias settings 410 can be implemented in any suitable user interface (UI).

The bias settings interface 500 can be configured to display one or more bias settings recommendations 502A-506A. The recommended settings can be calculated based on various factors such as the context of the virtual event 106, the topic of interest 204 for a particular user segment 110, a threshold factor score 404A-408A as configured by an event producer, and so forth. For instance, a virtual conference 106 on scientific research may result in a higher recommended speech bias setting 410C relative to a virtual event 106 for digital art which may have a higher recommended movement bias setting 410B.

In another example, an event producer, deeming orientation to be a low priority when determining interaction scores 402, may have set a low orientation bias setting 410A. However, model optimizer 114 may detect that user frequently have high orientation scores 404 which may be unrealistically suppressed by the low orientation bias setting 410A. Accordingly, a recommended bias setting 502A can be displayed to encourage to the event producer to increase the orientation bias settings 410A. The bias settings interface 500 can also include a selectable icon 508 to automatically apply recommended settings 502A-506A. In various examples, the selectable icon 508 can adjust all the bias settings 410 to the recommended settings 502A-506A. Alternatively, selectable icon 508 may allow an event producer to selectively apply one or more bias settings 410. For example, applying a recommended orientation bias 410A and movement bias 410B but not speech bias 410C.

Figure 6:
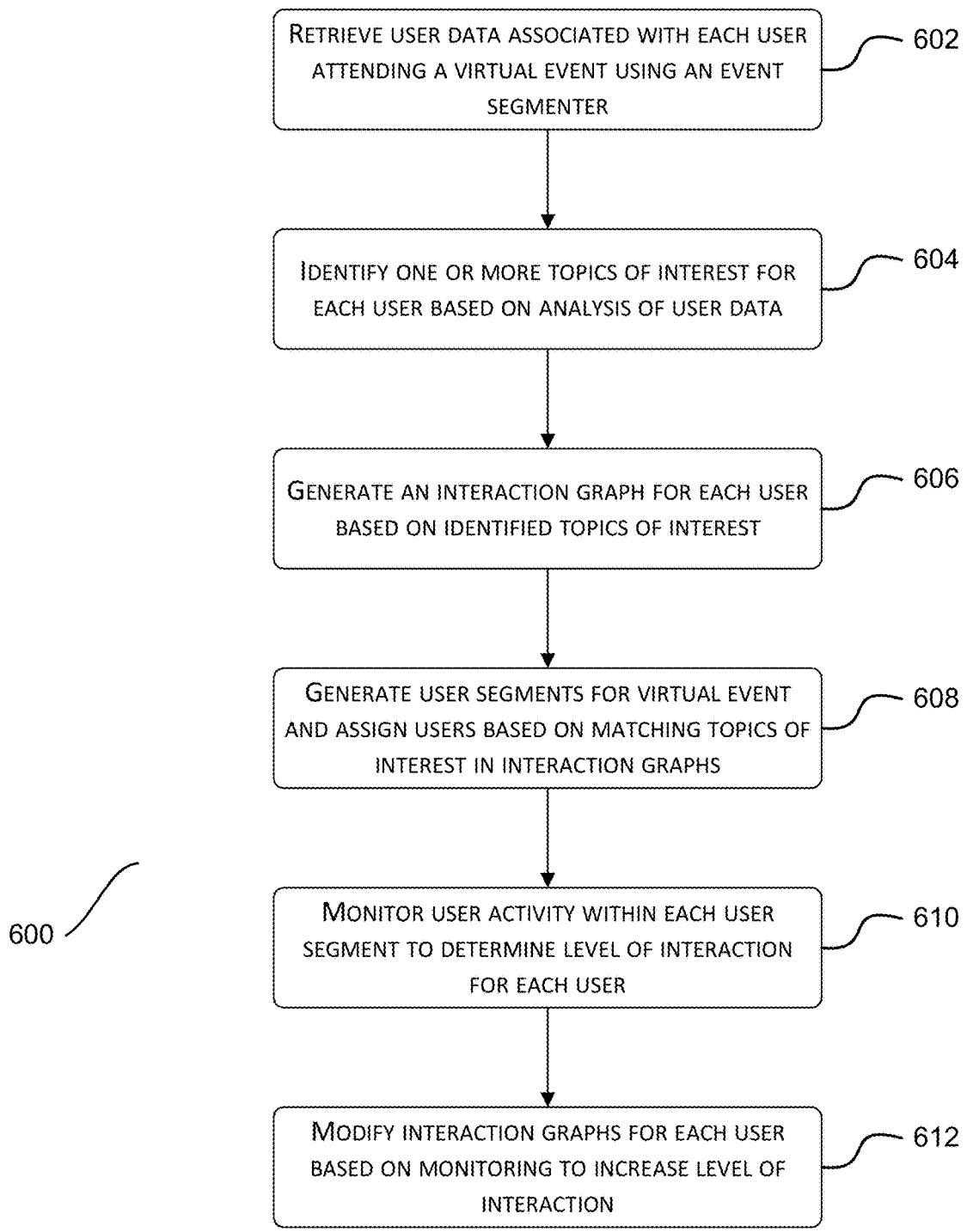
FIG. 6 is a flow diagram showing aspects of a routine for enabling the techniques disclosed herein.

Turning now to FIG. 6, aspects of routine for enabling segmentation based on interaction graphs are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 600 may be also implemented in many other ways. For example, the routine 600 may be implemented, at least in part, by a processor of another remote computer or a local circuit. In addition, one or more of the operations of the routine 600 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 6, routine 600 begins at operation 602 where an event segmenter retrieves user data for each user attending a virtual event. As described above, user data can define the various topics, interactions, and social connections associated with each user.

Proceeding to operation 604, the event segmenter analyzes the retrieved user data to identify one or more topics of interest for each user. As discussed above, topics of interest can relate to a user's professional experiences, personal interests and hobbies, and the like.

Next, at operation 606, the event segmenter generates an interaction graph for each user based on the identified topics of interest. The interaction graphs can also include subtopics associated with each topic of interest as illustrated in FIG. 2.

At operation 608, the event segmenter then generates user segments for the virtual event and assigns users to the user segments based on matching topics of interest as identified in the interaction graphs.

Next, at operation 610, the system monitors and analyzes user activity within each of the user segments to determine a level of interaction for each user. As described above, determining a level of interaction can include calculating an interaction score based on various factors.

Finally, at operation 612, the event segmenter modifies each user's interaction graph based on their associated level of interaction to promote increased interaction. As discussed above, this can include matching the user based on subtopics, a different topic of interest entirely, or simply continuing to match based on the initial matched topic of interest.

Figure 7:
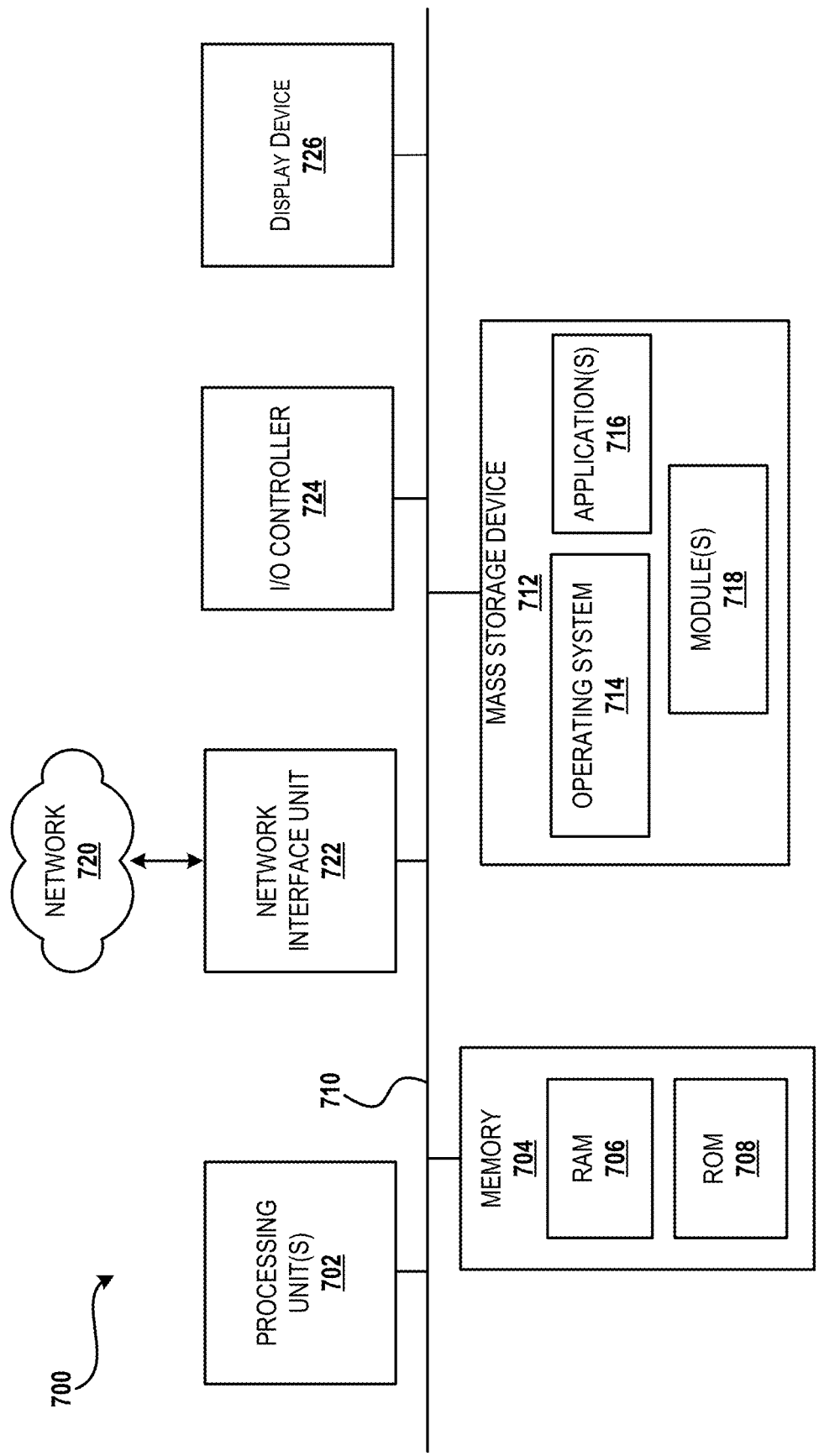
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the system 100, capable of executing computer instructions (e.g., a module or a program component described herein). The computer architecture 700 illustrated in FIG. 7 includes processing unit(s) 702, a system memory 704, including a random-access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

Figure 8:
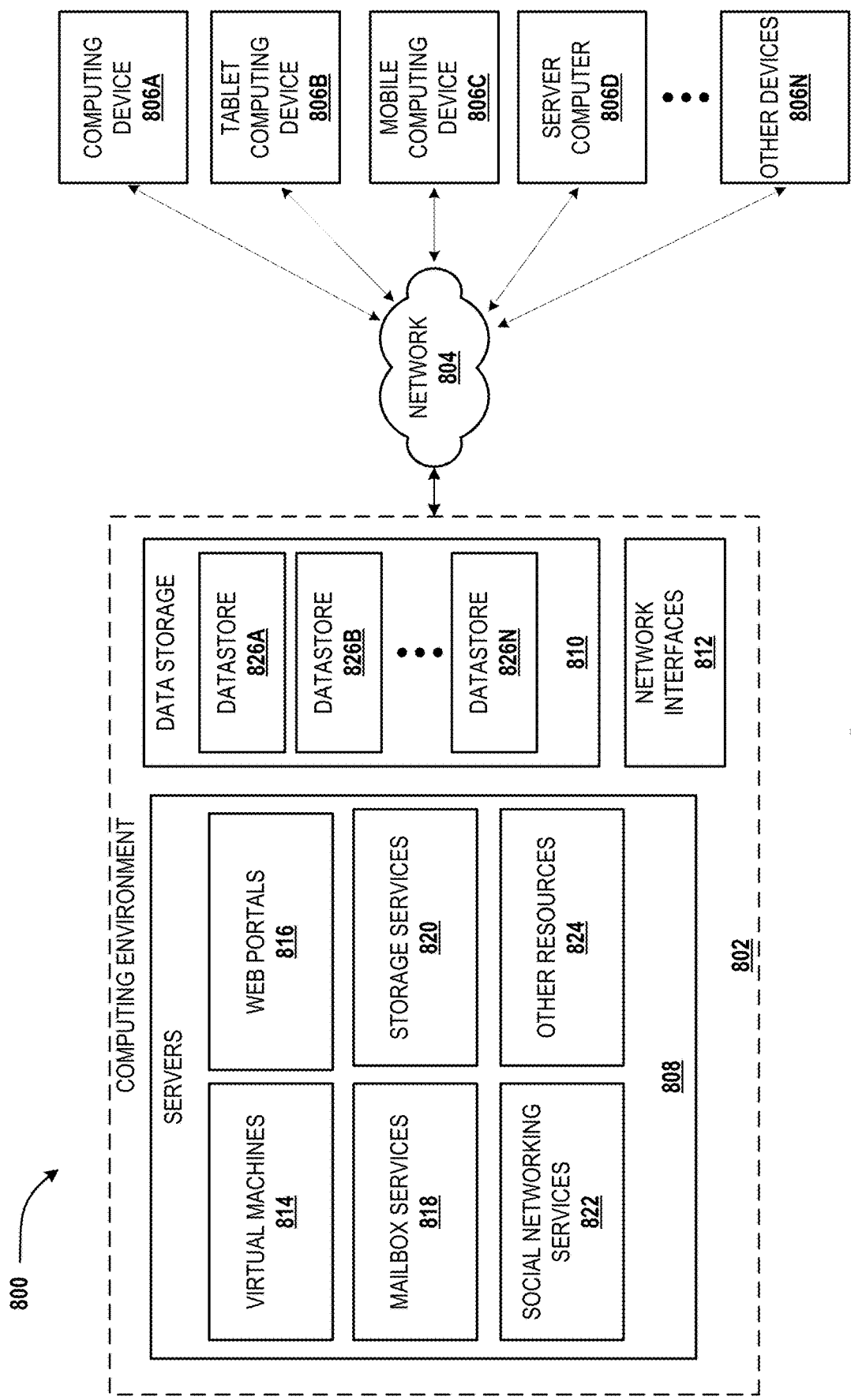
FIG. 8 is a diagram illustrating a distributed computing environment capable of implementing aspects of the techniques and technologies presented herein.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein.

Accordingly, the distributed computing environment 800 can include a computing environment 802 operating on, in communication with, or as part of the network 804. The network 804 can include various access networks. One or more client devices 806A-806N (hereinafter referred to collectively and/or generically as "clients 806" and also referred to herein as computing devices 806) can communicate with the computing environment 802 via the network 804. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or, social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the servers 708 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The disclosure presented herein also encompasses the subject matter set forth in the following clauses.

Example Clause A, a method for segmenting a plurality of users attending a virtual event comprising: retrieving, by one or more processing units, user data associated with each user of the plurality of users attending the virtual event; identifying one or more topics of interest for each user of the plurality of users based on the user data; generating an interaction graph for each user of the plurality of users based on the one or more identified topics of interest; generating, for the virtual event, a plurality of user segments based on a plurality of matching topics of interest in the interaction graphs generated for the plurality of users, wherein an individual user segment of the plurality of user segments is assigned at least two of the plurality of users; monitoring for user interactions within the plurality of user segments to determine a level of interaction for each of the users; and modifying, for each user of the plurality of users and based on the monitoring, the interaction graph to increase the level of interaction for the user.

Example Clause B, the method of Example Clause A, wherein the user data for an individual user comprises interaction data defining interactions between the user and other users in previous user segments.

Example Clause C, the method of Example Clause A or Example Clause B, wherein the user data for an individual user comprises topic data defining one or more areas of expertise of the user based on an analysis of user activity associated with one or more documents having an associated topic.

Example Clause D, the method of any one of Example Clauses A through C, wherein the user data for an individual user comprises social data defining one or more relationships between the user and other users.

Example Clause E, the method of any one of Example Clauses A through D, wherein generating a user segment causes a display of a three-dimensional environment on one or more head-mounted computing devices of the at least two of the plurality of users assigned to the user segment, wherein the three-dimensional environment comprises a plurality of objects that are placed within the three-dimensional environment.

Example Clause F, the method of any one of Example Clauses A through E, wherein the level of interaction comprises one or more of an amount of speech, a level of movement, an orientation of the user in relation to other users in a user segment, and a position of the user in relation to other users in the user segment.

Example Clause G, the method of any one of Example Clauses A through F, further comprising: detecting that the level of interaction for each of a threshold number of users in a user segment generated based on at least one of the plurality of matching topics of interest is below a threshold level of interaction; in response to the detecting, determining that the at least one of the plurality of matching topics of interest is unsuitable for user segment generation; and modifying the interaction graphs of the plurality of users attending the virtual event by tagging the at least one of the plurality of matching topics to prevent generation of additional user segments for the at least one of the plurality of matching topics of interest.

Example Clause H, the method of any one of Example Clauses A through F, further comprising: detecting that the level of interaction for each of a threshold number of users in a user segment generated based on at least one of the plurality of matching topics of interest is above the threshold level of interaction; in response to the detecting, determining that the at least one of the plurality of matching topics of interest is suitable for user segment generation; detecting that the level of interaction for one or more other users in the user segment generated based on at least one of the plurality of matching topics of interest is below the threshold level of interaction; modifying the interaction graphs of the one or more users having the level of interaction that is below the threshold level of interaction by tagging the at least one of the plurality of matching topics of interest as low interest; and reassigning the one or more users to one or more other user segments based on a matching topic of interest that is different from the at least one of the plurality of matching topics of interest.

Example Clause I, the method of any one of Example Clauses A through H, wherein the one or more topics of interest are a predefined set of topics of interest that are identified by a machine learning application at a network-based content management system based on one or more categories of activity.

Example Clause J, the method of any one of Example Clauses A through I, wherein the level of interaction is a numerical score that is calculated based on a plurality of factor scores having one or more bias settings applied to the factor scores for emphasizing or deemphasizing one or more of the plurality of factor scores.

Example Clause K, a system for segmenting a plurality of users attending a virtual event comprising: one or more processing units; and a computer-readable medium having encoded thereon computer-readable instructions to cause the one or more processing units to: retrieve user data associated with each user of the plurality of users attending the virtual event; identify one or more topics of interest for each user of the plurality of users based on the user data; generate an interaction graph for each user of the plurality of users based on the one or more identified topics of interest; generate, for the virtual event, a plurality of user segments based on a plurality of matching topics of interest in the interaction graphs generated for the plurality of users, wherein an individual user segment of the plurality of user segments is assigned at least two of the plurality of users; monitor for user interactions within the plurality of user segments to determine a level of interaction for each of the users; and modify, for each user of the plurality of users and based on the monitoring, the interaction graph to increase the level of interaction of the user.

Example Clause L, the system of Example Clause K, wherein generating a user segment causes a display of a three-dimensional environment on one or more computing devices associated with the user segment comprising a plurality of interactable objects that are placed within the three-dimensional environment.

Example Clause M, the system of any one of Example Clause K or Example Clause L, wherein the level of interaction comprises one or more of an amount of speech, a level of movement, an orientation of the user in relation to other users of the user segment, and a position of the user in relation to other users of the user segment.

Example Clause N, the system of any one of Example Clauses K though M, wherein the computer-readable instructions further cause the one or more processing units to: detect that the level of interaction for a threshold number of users of a user segment for a matched topic of interest is below a threshold level of interaction; in response to the detecting, determine that the matched topic of interest is unsuitable for user segment generation; and remove the matched topic of interest from the interaction graphs of the plurality of users of the virtual event to prevent generation of additional user segments for the matched topics of interest.

Example Clause O, the system of any one of Example Clauses K through M, wherein the computer-readable instructions further cause the one or more processing units to: detect that the level of interaction for each of a threshold number of users in a user segment generated based on at least one of a plurality of matching topics of interest is above a threshold level of interaction; in response to the detecting, determine that the at least one of the plurality of matching topics of interest is suitable for user segment generation; detect that the level of interaction for one or more other users in the user segment generated based on at least one of the plurality of matching topics of interest is below the threshold level of interaction; modifying the interaction graphs of the one or more users having the level of interaction that is below the threshold level of interaction by tagging the at least one of the plurality of matching topics of interest as low interest; and reassigning the one or more users to one or more other user segments based on a matching topic of interest that is different from the at least one of the plurality of matching topics of interest.

Example Clause P, a computer-readable storage medium having encoded thereon computer-readable instructions to cause one or more processing units to: retrieve user data associated with each user of a plurality of users attending a virtual event; identify one or more topics of interest for each user of the plurality of users based on the user data; generate an interaction graph for each user of the plurality of users based on the one or more identified topics of interest; generate, for the virtual event, a plurality of user segments based on a plurality of matching topics of interest in the interaction graphs generated for the plurality of users, wherein an individual user segment of the plurality of user segments is assigned at least two of the plurality of users; monitor for user interactions within the plurality of user segments to determine a level of interaction for each of the users; and modify, for each user of the plurality of users and based on the monitoring, the interaction graph to increase the level of interaction of the user.

Example Clause Q, the computer-readable storage medium of Example Clause P, wherein generating a user segment causes a display of a three-dimensional environment on one or more head-mounted computing devices of the at least two of the plurality of users assigned to the user segment, wherein the three-dimensional environment comprises a plurality of objects that are placed within the three-dimensional environment.

Example Clause R, the computer-readable storage medium of any one of Example Clause P or Example Clause Q, wherein the level of interaction comprises one or more of an amount of speech, a level of movement, an orientation of the user in relation to other users of the user segment, and a position of the user in relation to other users of the user segment.

Example Clause S, the computer-readable storage medium of any one of Example Clauses P through R, wherein the plurality of user segments are a portion of the virtual event and are generated during a time period before or after a different portion of the virtual event, where the plurality of matching topics of interest for generating the plurality of user segments are derived from a topic of interest of the virtual event.

Example Clause T, the computer-readable storage medium of any one of Example Clauses P through S, wherein the level of interaction is a numerical score that is calculated based on a plurality of factor scores having one or more bias settings applied to the factor scores for emphasizing or deemphasizing one or more of the plurality of factor scores.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different user segments, two different topics of interest, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for segmenting a plurality of users attending a virtual event comprising:
    retrieving, by one or more processing units, user data associated with each user of the plurality of users attending the virtual event;
    identifying one or more topics of interest for each user of the plurality of users based on the user data;
    generating an interaction graph for each user of the plurality of users based on the one or more identified topics of interest;
    generating, for the virtual event, a plurality of user segments based on a plurality of matching topics of interest in the interaction graphs generated for the plurality of users, wherein an individual user segment of the plurality of user segments is assigned at least two of the plurality of users;

monitoring for user interactions within the plurality of user segments to determine a level of interaction for each of the plurality of users;

detecting that the level of interaction for each of a threshold number of users in a user segment is below a threshold level of interaction;

in response to the detecting, determining that a matching topic of interest for the user segment is unsuitable for user segment generation; and modifying the interaction graphs for the plurality of users by tagging the matching topic of interest to prevent generation of additional user segments for the matching topic of interest.

2. The method of claim 1, wherein the user data for an individual user comprises interaction data defining interactions between the user and other users in previous user segments.

3. The method of claim 1, wherein the user data for an individual user comprises topic data defining one or more areas of expertise of the user based on an analysis of user activity associated with one or more documents having an associated topic.

4. The method of claim 1, wherein the user data for an individual user comprises social data defining one or more relationships between the user and other users.

5. The method of claim 1, wherein generating a user segment causes a display of a three-dimensional environment on one or more head-mounted computing devices of the at least two of the plurality of users assigned to the user segment, wherein the three-dimensional environment comprises a plurality of objects that are placed within the three-dimensional environment.

6. The method of claim 1, wherein the level of interaction comprises one or more of an amount of speech, a level of movement, an orientation of the user in relation to other users in a user segment, and a position of the user in relation to other users in the user segment.

7. The method of claim 1, further comprising:

detecting that the level of interaction for each of a threshold number of users in another user segment generated based on at least one of the plurality of matching topics of interest is above the threshold level of interaction;

in response to the detecting, determining that the at least one of the plurality of matching topics of interest is suitable for user segment generation;

detecting that the level of interaction for one or more other users in the other user segment generated based on at least one of the plurality of matching topics of interest is below the threshold level of interaction;

modifying the interaction graphs of the one or more users having the level of interaction that is below the threshold level of interaction by tagging the at least one of the plurality of matching topics of interest as low interest; and reassigning the one or more users to one or more other user segments based on a matching topic of interest that is different from the at least one of the plurality of matching topics of interest.

8. The method of claim 1, wherein the one or more topics of interest are a predefined set of topics of interest that are identified by a machine learning application at a network-based content management system based on one or more categories of activity.

9. The method of claim 1, wherein the level of interaction is a numerical score that is calculated based on a plurality of factor scores having one or more bias settings applied to the factor scores for emphasizing or deemphasizing one or more of the plurality of factor scores.

10. A system for segmenting a plurality of users attending a virtual event comprising:

one or more processing units; and a computer-readable medium having encoded thereon computer-readable instructions to cause the one or more processing units to:

retrieve user data associated with each user of the plurality of users attending the virtual event;

identify one or more topics of interest for each user of the plurality of users based on the user data;

generate an interaction graph for each user of the plurality of users based on the one or more identified topics of interest;

generate, for the virtual event, a plurality of user segments based on a plurality of matching topics of interest in the interaction graphs generated for the plurality of users, wherein an individual user segment of the plurality of user segments is assigned at least two of the plurality of users;

monitor for user interactions within the plurality of user segments to determine a level of interaction for each of the users;

detect that the level of interaction for each of a threshold number of users in a user segment is above a threshold level of interaction;

in response to the detecting, determine that a matching topic of interest for the user segment is suitable for user segment generation; and modify the interaction graphs for the plurality of users by tagging the matching topic of interest to promote generation of additional user segments for the matching topic of interest.

11. The system of claim 10, wherein generating a user segment causes a display of a three-dimensional environment on one or more computing devices associated with the user segment comprising a plurality of interactable objects that are placed within the three-dimensional environment.

12. The system of claim 10, wherein the level of interaction comprises one or more of an amount of speech, a level of movement, an orientation of the user in relation to other users of the user segment, and a position of the user in relation to other users of the user segment.

13. The system of claim 10, wherein the computer-readable instructions further cause the one or more processing units to:

detect that the level of interaction for a threshold number of users of another user segment for a matching topic of interest is below a threshold level of interaction;

in response to the detecting, determine that the matching topic of interest is unsuitable for user segment generation; and remove the matching topic of interest from the interaction graphs of the plurality of users of the virtual event to prevent generation of additional user segments for the matching topic of interest.

14. The system of claim 10, wherein the computer-readable instructions further cause the one or more processing units to:

detect that the level of interaction for one or more other users in the user segment generated based on at least one of the plurality of matching topics of interest is below the threshold level of interaction;

modify the interaction graphs of the one or more users having the level of interaction that is below the threshold level of interaction by tagging the at least one of the plurality of matching topics of interest as low interest; and reassign the one or more users to one or more other user segments based on a matching topic of interest that is different from the at least one of the plurality of matching topics of interest.

15. A non-transitory computer-readable storage medium having encoded thereon computer-readable instructions to cause one or more processing units to:

retrieve user data associated with each user of a plurality of users attending a virtual event;

identify one or more topics of interest for each user of the plurality of users based on the user data;

generate an interaction graph for each user of the plurality of users based on the one or more identified topics of interest;

generate, for the virtual event, a plurality of user segments based on a plurality of matching topics of interest in the interaction graphs generated for the plurality of users, wherein an individual user segment of the plurality of user segments is assigned at least two of the plurality of users;

monitor for user interactions within the plurality of user segments to determine a level of interaction for each of the users;

detect that the level of interaction for each of a threshold number of users in a user segment is below a threshold level of interaction;

in response to the detecting, determine that a matching topic of interest for the user segment is unsuitable for user segment generation; and modify the interaction graphs for the plurality of users by tagging the matching topic of interest to prevent generation of additional user segments for the matching topic of interest.

16. The non-transitory computer-readable storage medium of claim 15, wherein generating a user segment causes a display of a three-dimensional environment on one or more head-mounted computing devices of the at least two of the plurality of users assigned to the user segment, wherein the three-dimensional environment comprises a plurality of objects that are placed within the three-dimensional environment.

17. The non-transitory computer-readable storage medium of claim 15, wherein the level of interaction comprises one or more of an amount of speech, a level of movement, an orientation of the user in relation to other users of the user segment, and a position of the user in relation to other users of the user segment.

18. The non-transitory computer-readable storage medium of claim 15, wherein the plurality of user segments is a portion of the virtual event and are generated during a time period before or after a different portion of the virtual event, where the plurality of matching topics of interest for generating the plurality of user segments are derived from a topic of interest of the virtual event.

19. The non-transitory computer-readable storage medium of claim 15, wherein the level of interaction is a numerical score that is calculated based on a plurality of factor scores having one or more bias settings applied to the factor scores for emphasizing or deemphasizing one or more of the plurality of factor scores.

* * * * *